Aug. 19, 1958 J. H. RIGGS 2,848,557
AUTOMATIC VOLUME LEVEL CONTROL FOR PHONOGRAPHS
Filed March 22, 1952
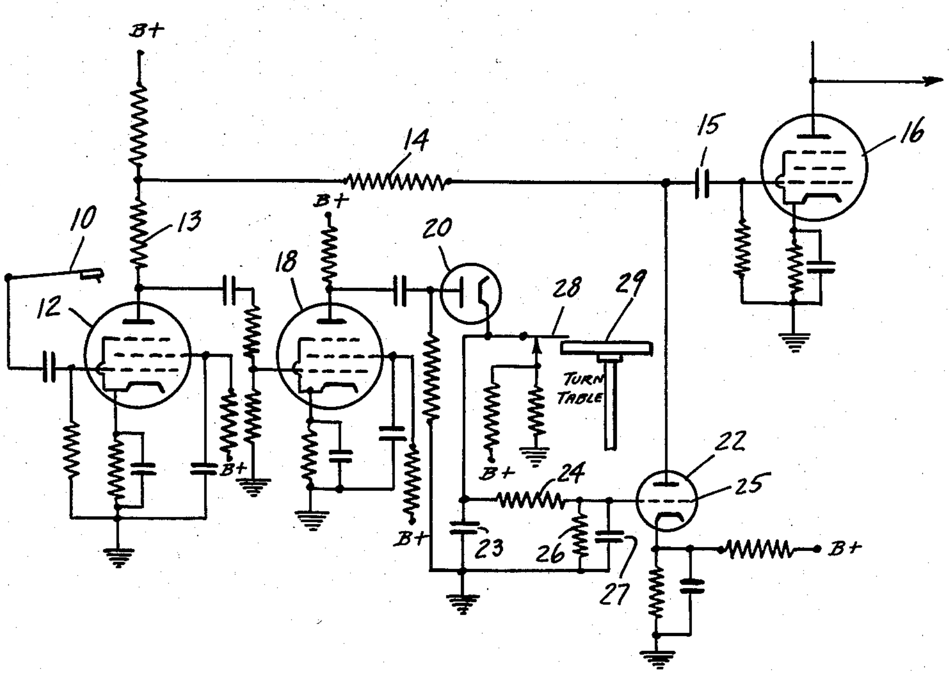
INVENTOR.
JOHN H. RIGGS.
BY
Lockwood, Hahn, Galt & Woodard,
ATTORNEYS.

United States Patent Office 2,848,557

Patented Aug. 19, 1958

2,848,557

AUTOMATIC VOLUME LEVEL CONTROL FOR PHONOGRAPHS

John H. Riggs, Kenmore, N. Y., assignor to The Rudolph Wurlitzer Company, Chicago, Ill., a corporation Application March 22, 1952, Serial No. 277,957

5 Claims. (Cl. 179—100.4)

This invention relates generally to audio frequency amplifiers and more particularly to automatic volume level control systems for phonograph amplifiers.

In commercial operation of coin operated phonographs it is customary to load the machine with phonograph records and pre-set the volume control of the amplifier to produce what appears to be an average volume level which will provide the listeners with a satisfactory and pleasing rendition of a musical selection. However, practical experience shows that individual phonograph records are cut in varying degrees of amplitude whereby the volume output of one record in terms of watts may be materially greater than the volume output of another record. Hence a volume control adjustment for one record or a group of records may provide the desired sound output volume while for another record or group of records the same adjustment of the amplifier may provide excessively high volume or too low volume for satisfactory listening.

Accordingly, the principal object of this invention is to provide, in a phonograph audio frequency amplifier, an automatic volume level control system for maintaining the amplifier output level at a substantially constant value.

Another object of this invention is to provide, in an automatic volume level control system for a phonograph audio frequency amplifier, an electrical and mechanical means adapted to maintain in the amplifier output a predetermined average level during the starting period of a record playing cycle.

In accordance with this invention there is provided an automatic volume level control system for establishing a substantially constant average volume level in the output of a multi-stage phonograph amplifier comprising a means for deriving a potential representative of the volume level in one stage of said amplifier and a means for utilizing said potential in the input circuit of the succeeding stage of said amplifier to hold the average volume level of signals in said input circuit to a substantially constant value.

In accordance with another feature of this invention, there is provided an automatic level control system for providing a substantially constant average volume level in the output of a phonograph amplifier comprising a means operatively associated with the phonograph mechanism for providing a level control potential during the initial period of each record playing cycle.

For the purpose of disclosing the invention I have illustrated an embodiment thereof in the accompanying drawing which is a circuit diagram and a schematic showing of the operative association of the circuit provided in accordance with this invention with the turntable of an automatic phonograph.

In the drawings there is provided in accordance with this invention a conventional phonograph pickup 10 which may be electrically coupled to the control grid of amplifier stage 12, the output of which is coupled through resistances 13 and 14 and through condenser 15 to the control grid of a second amplifier stage 16. Amplifier stages 12 and 16 may comprise any desired suitable electron tubes of known type and the connections of the energizing circuits and other circuit components are not described in detail as they are conventional and do not form any part of this invention.

For automatically controlling the volume level within the input circuit of tube 16 there is provided an auxiliary amplifier stage 18 coupled by conventional means to the anode of tube 12. The anode of tube 18 is in turn coupled to a conventional rectifying tube 20. A resistance tube 22 may be coupled to rectifier 20 by means of a resistance-capacity time constant network consisting of a condenser 23 connected in series between ground and the cathode of rectifier 20, a resistor 24 connected in series between the cathode of rectifier 20 and control grid 25 of resistance tube 22, together with resistor 26 and condenser 27 connected in parallel with one another and between control grid 25 and ground. The anode of tube 22 may be connected between resistor 14 and condenser 15 thereby to form a shunt resistor with respect to the input circuit of tube 16.

During the normal playing cycle of the phonograph record the signal output of pickup 10 is fed in conventional manner through a first stage of amplification in tube 12 and to the control grid of tube 16. A portion of the signal output of tube 12 may be fed into the input circuit of amplifier 18, the output of which may be rectified by rectifier tube 20 and its associated circuit components, thereby to produce a signal representative of the volume level of signals in the output of tube 12. This signal is a positive unidirectional voltage appearing on the control grid 25 of tube 22. Thus, variations in average amplitude of signals in the output of tube 12 produce the variations in the unidirectional voltage impressed on grid 25. If the amplitude of signals in the output of tube 12 increases, the positive unidirectional voltage on grid 25 shows a proportional increase. The effect of this increased voltage is to decrease the direct current resistance of tube 22 thereby to decrease the amplitude of signals appearing in the input circuit of amplifier stage 16. Conversely, a decrease in amplitude of the signals in the output of tube 22 causes a decrease in the value of the unidirectional voltage impressed on control grid 25, thereby increasing the effective resistance of tube 22 and increasing the amplitude of signals impressed on the control grid of tube 16. Thus it becomes apparent that when a record having grooves cut of greater amplitude than average is played on an automatic phonograph, the signals appearing in the input circuit of tube 16 are correspondingly decreased in value to provide signals having a desired average volume level. If on the other hand a record having a groove cut with less than normal amplitude is played on the phonograph, the signals appearing in the output of tube 12 will effect the unidirectional voltage on control grid 25 in such a manner as to increase the amplitude of signals appearing in the input of tube 16.

The above described mode of operation is effective after the initial playing period of the record, but it will be apparent that when the first sound signals are picked up from the record, there can be a period during which there would be no voltage on the grid 25 and this condition would produce a "blasting" effect if no provisions were made for preventing such an effect. Accordingly, the normally closed switch 28 may be connected to the cathode circuit of rectifier 20 and to the source of B plus potential. For operating switch 28 provisions may be made whereby some portion of the phonograph which moves during the initial part of a record playing cycle will contact the switch arm to open the switch. For example, certain types of coin operated phonographs include a turntable which is vertically movable for receiving a selected record. Typical phonographs of this type are shown in U. S. patents No. 2,002,236 issued May 21, 1935, and No. 2,189,077 issued February 6, 1940. Accordingly, the turntable 29 may be arranged to open switch 28 during the initial portion of its vertical movement. Preferably switch 28 is a "microswitch" settable to an "off" position, when turntable 29 rises, where it remains until reset to an "on" position when turntable 29 approaches its lowermost position or its position of "rest."

During the idle periods of the phonograph the normally closed switch 28 provides a positive potential, from B plus on the network consisting of condensers 23 and 27 and resistors 24 and 26, and this positive potential also appears on the grid of tube 22. Hence, turntable 29 may be moved vertically to receive a record and open switch 28. The network is so designed as to provide a time lag for maintaining a potential on grid 25 even through switch 28 is opened. This time lag may be sufficiently long to hold the predetermined potential on tube 22 and thus hold the level of signals at a predetermined value in the input circuit to tube 16. As the playing of the record continues, signals derived from the output circuit of tube 12 will naturally build up a unidirectional voltage porportional to their amplitude for maintaining the average volume level in the input of tube 16 as described hereinbefore.

While this invention has been described and shown as including tubes of certain definite types, it will be obvious to those skilled in the art that other types of tubes, including single-envelope, double tubes, may be utilized. It will also be obvious that the circuit components connected with these tubes may be chosen in accordance with well-known practice to provide the desired functioning of the particular tubes. The resistance-capacity time constant network may also be modified to provide different arrangements of resistances, condensers or other impedances to provide a time constant of any desired value.

The invention claimed is:

1. In an automatic phonograph having an intermittently operated audio amplifier, an automatic level control circuit for providing a constant average volume level in the output of said amplifier comprising means connected in the output of a first stage of said audio amplifier for deriving a signal proportional to the signal level in said amplifier stage, an electron tube coupled between said signal deriving means and the input of a second stage of said audio amplifier and responsive to said signal voltage for predetermining the level of the input signal impressed on said second stage, and a storage circuit operatively associated with the mechanism of said phonograph and controlled thereby to energize said electron tube during idle periods of said phonograph and to establish normal signal level in the input of said second amplifying stage during the initial period of operation of said phonograph.

2. In an automatic phonograph having an intermittently operated audio amplifier, an automatic level control circuit for providing a constant average volume level in the output of said amplifier comprising a rectifying means connected in the output of a first stage of said audio amplifier for deriving a unidirectional voltage proportional to the signal level in said amplifier stage, an electron tube coupled between said rectifying means and the input of a second stage of said audio amplifier and responsive to said unidirectional voltage for varying the level of the input signal impressed on said second stage, a switch operatively associated with a source of potential and the mechanism of said phonograph and controlled thereby to energize said tube during idle periods of said phonograph and potential storage means connected between the input of said electron tube and said switch for maintaining operating potential on said electron tube thereby to establish normal signal level in the input of said second amplifying stage during the initial period of operation of said phonograph.

3. In an automatic phonograph having an intermittently operated audio amplifier, an automatic level control circuit for providing a constant average volume level in the output of said amplifier comprising a means connected in the output of a first stage of said audio amplifier for deriving a voltage proportional to the signal level in said amplifier stage, a variable resistance coupled between said voltage deriving means and the input of a second stage of said audio amplifier and responsive to said voltage for varying the level of the input signal impressed on said second stage, a switch operatively associated with a source of potential and the mechanism of said phonograph and controlled thereby to energize said tube during idle periods of said phonograph, and a time constant circuit connected between the input of said variable resistance and said switch for maintaining a potential on said variable resistance thereby to establish normal signal level in the input of said second amplifying stage during the initial period of operation of said phonograph.

4. In an automatic phonograph having an intermittently operated audio amplifier, an automatic level control circuit for providing a constant average volume level in the output of said amplifier comprising a rectifying means connected in the output of a first stage of said audio amplifier for deriving a unidirectional voltage proportional to the signal level in said amplifier stage, a resistance tube coupled between said rectifying means and the input of a second stage of said audio amplifier and responsive to said unidirectional voltage for varying the level of the input signal impressed on said second stage, a switch operatively associated with a source of potential and the mechanism of said phonograph and controlled thereby to energize said tube during idle periods of said phonograph, and a time constant circuit connected between the input of said resistance tube and said switch for maintaining operating potential on said resistance tube thereby to establish normal signal level in the input of said second amplifying stage during the initial period of operation of said phonograph.

5. In an automatic phonograph, an intermittently operated, multistage, audio amplifier, an automatic level control circuit for providing a constant average volume level in the output of said amplifier comprising a means connected in the output of one stage of said audio amplifier for deriving a signal representative of the signal level in said amplifier stage, variable impedance means coupled between said signal deriving means and the input of another stage of said audio amplifier for utilizing said signal to control the level of the input signal impressed on said other stage, and circuit means operatively associated with the mechanism of said phonograph and controlled thereby to vary said impedance means during idle periods of said phonograph and to establish normal signal level in the input of said other amplifying stage during the initial period of operation of said phonograph.

References Cited in the file of this patent

UNITED STATES PATENTS

| | | |
|---|---|---|
| 2,221,086 | Foster | Nov. 12, 1940 |
| 2,343,471 | Nixon | Mar. 7, 1944 |
| 2,369,952 | Devine | Feb. 20, 1945 |
| 2,433,342 | Chatterjea et al. | Dec. 30, 1947 |
| 2,444,676 | Roberts et al. | July 6, 1948 |
| 2,525,103 | Sprecher | Oct. 10, 1950 |
| 2,554,905 | Hawkins et al. | May 29, 1951 |
| 2,559,902 | Scott | July 10, 1951 |